US012046461B2

(12) United States Patent
Kimura et al.

(10) Patent No.: US 12,046,461 B2
(45) Date of Patent: Jul. 23, 2024

(54) POWER GENERATION ELEMENT

(71) Applicant: KABUSHIKI KAISHA TOSHIBA, Tokyo (JP)

(72) Inventors: Shigeya Kimura, Yokohama (JP); Hisashi Yoshida, Kawasaki (JP); Hisao Miyazaki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 522 days.

(21) Appl. No.: 17/169,969

(22) Filed: Feb. 8, 2021

(65) Prior Publication Data

US 2021/0384019 A1 Dec. 9, 2021

(30) Foreign Application Priority Data

Jun. 5, 2020 (JP) ................................ 2020-098560

(51) Int. Cl.
*H01J 45/00* (2006.01)

(52) U.S. Cl.
CPC .................................. *H01J 45/00* (2013.01)

(58) Field of Classification Search
USPC ................................ 313/306, 309, 336, 351
See application file for complete search history.

(56) References Cited

U.S. PATENT DOCUMENTS

| | | | |
|---|---|---|---|
| 5,747,927 A | 5/1998 | Namikawa et al. | |
| 2011/0139205 A1 | 6/2011 | Kimura et al. | |
| 2013/0306124 A1* | 11/2013 | Yajima ................ | H10N 10/852 136/205 |
| 2018/0337317 A1 | 11/2018 | Kimura et al. | |

FOREIGN PATENT DOCUMENTS

| | | |
|---|---|---|
| JP | 8-250048 A | 9/1996 |
| JP | 2000-182510 A | 6/2000 |
| JP | 2003-86076 A | 3/2003 |

(Continued)

OTHER PUBLICATIONS

Trucchi, "Final Report Summary—E2PHEST2US (Enhanced energy production of heat and electricity by a combined solar thermionic-thermoelectric unit system)",—E2PHEST2US, No. 241270, www.ephestus.eu, 2012, 29 pages.

(Continued)

*Primary Examiner* — Ashok Patel
(74) *Attorney, Agent, or Firm* — Oblon, McClelland, Maier & Neustadt, L.L.P.

(57) ABSTRACT

According to one embodiment, a power generation element includes an element part. The element part includes a first conductive member, a second conductive member, and a plurality of first structure bodies provided between the first conductive member and the second conductive member. One of the first structure bodies includes a first portion and a second portion. The first portion is fixed to the first conductive member. The second portion is between the first portion and the second conductive member. A second length along a second direction of the second portion is less than a first length along the second direction of the first portion. The second direction crosses a first direction from the first conductive member toward the second conductive member.

20 Claims, 9 Drawing Sheets

(56) References Cited

FOREIGN PATENT DOCUMENTS

| | | | |
|---|---|---|---|
| JP | 2006-253341 | A | 9/2006 |
| JP | 2010-205883 | A | 9/2010 |
| JP | 2011-124412 | A | 6/2011 |
| JP | 2012-175781 | A | 9/2012 |
| JP | 2018-195790 | A | 12/2018 |

OTHER PUBLICATIONS

Lee, et al., "Optimal emitter-collector gap for thermionic energy converters" Appl. Phys. Lett. 100, 173904, https://doi.org/10.1063/1.4707379, 2012, 5 pages.

Kato, et al., "Heavily phosphorus-doped nano-crystalline diamond electrode for thermionic emission application", Diamond & Related Materials 63, 2016, 4 pages.

Melosh, et al., "Nx-TEC: Next-Generation Thermionic Solar Energy Conversion" SLAC National Accelerator Laboratory, Materials Science & Engineering, Stanford University, Oct. 2012, 23 pages.

* cited by examiner

POWER GENERATION ELEMENT

CROSS-REFERENCE TO RELATED APPLICATIONS

This application is based upon and claims the benefit of priority from Japanese Patent Application No. 2020-098560, filed on Jun. 5, 2020; the entire contents of which are incorporated herein by reference.

FIELD

Embodiments described herein generally relate to a power generation element.

BACKGROUND

For example, there is a power generation element including an emitter electrode to which heat is applied from a heat source, and a collector electrode capturing thermions from the emitter electrode. It is desirable to increase the efficiency of the power generation element.

DETAILED DESCRIPTION

Figure 1A:
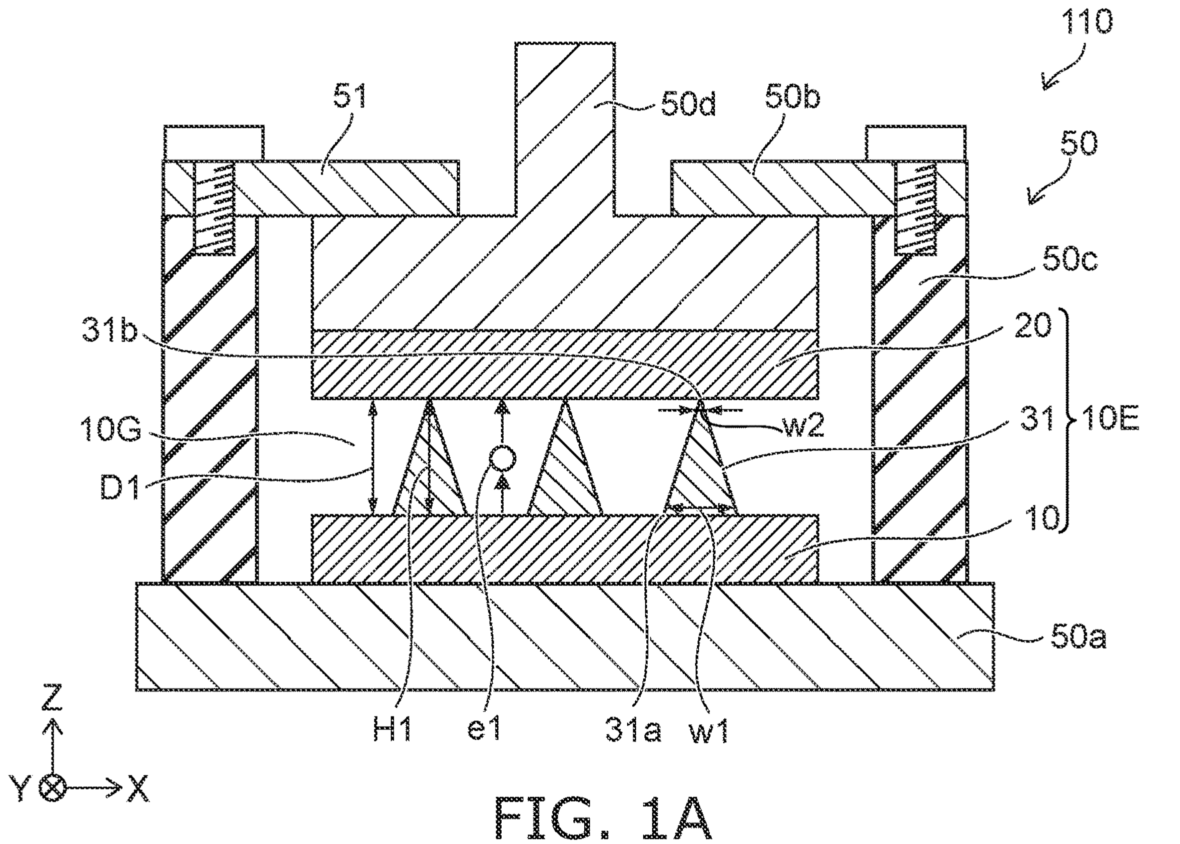
FIGS. 1A and 1B are schematic views illustrating a power generation element according to a first embodiment.

According to one embodiment, a power generation element includes an element part. The element part includes a first conductive member, a second conductive member, and a plurality of first structure bodies provided between the first conductive member and the second conductive member. One of the first structure bodies includes a first portion and a second portion. The first portion is fixed to the first conductive member. The second portion is between the first portion and the second conductive member. A second length along a second direction of the second portion is less than a first length along the second direction of the first portion. The second direction crosses a first direction from the first conductive member toward the second conductive member.

According to one embodiment, a power generation element includes an element part. The element part includes a first conductive member, a second conductive member, and a plurality of first structure bodies provided between the first conductive member and the second conductive member. One of the first structure bodies includes a first portion and a second portion. The second portion is between the first portion and the second conductive member. The first portion is chemically bonded with the first conductive member. The second portion abuts the second conductive member.

Various embodiments are described below with reference to the accompanying drawings.

The drawings are schematic or conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with the same reference numerals, and a detailed description is omitted as appropriate.

First Embodiment

Figure 1B:
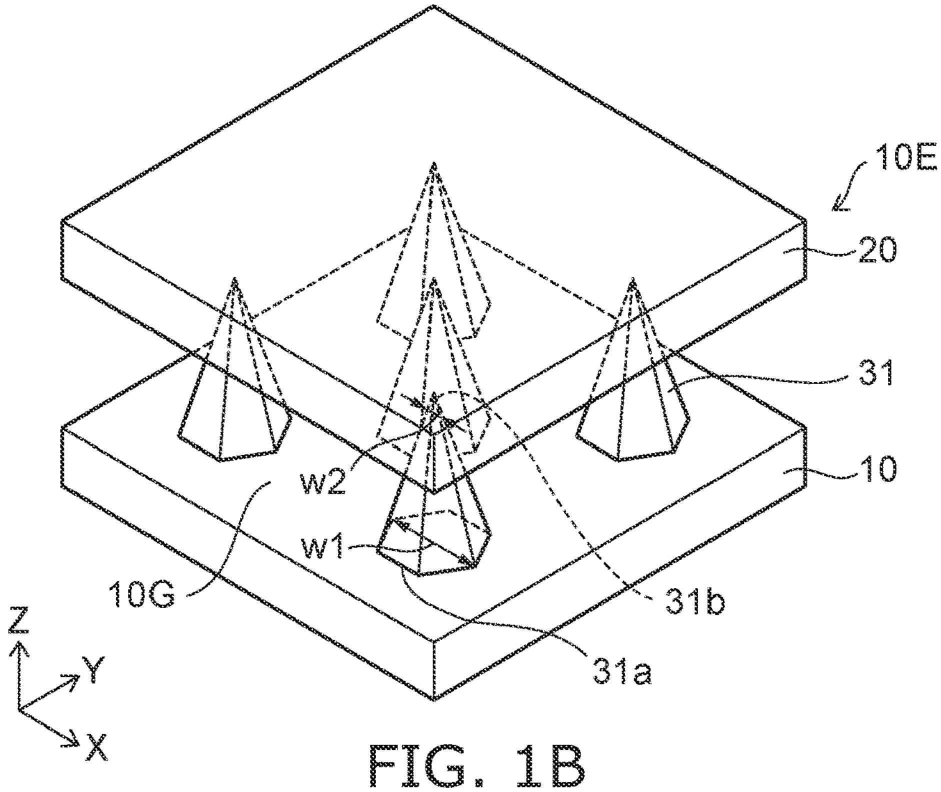

FIGS. 1A and 1B are schematic views illustrating a power generation element according to a first embodiment. FIG. 1A is a cross-sectional view. FIG. 1B is a perspective view of a portion of the power generation element.

As shown in FIG. 1A, the power generation element 110 according to the embodiment includes an element part 10E. The power generation element 110 may further include a container 50. The element part 10E is located in the container 50. For example, the air pressure in the container 50 is less than atmospheric pressure.

The element part 10E includes a first conductive member 10, a second conductive member 20, and multiple first structure bodies 31. The multiple first structure bodies 31 are located between the first conductive member 10 and the second conductive member 20.

One of the multiple first structure bodies 31 includes a first portion 31*a* and a second portion 31*b*. The first portion 31*a* is fixed to the first conductive member 10. The second portion 31*b* is between the first portion 31*a* and the second conductive member 20. In the example, the second portion 31*b* is an end portion of the first structure body 31.

A first direction from the first conductive member 10 toward the second conductive member 20 is taken as a Z-axis direction. One direction perpendicular to the Z-axis direction is taken as an X-axis direction. A direction perpendicular to the Z-axis direction and the X-axis direction is taken as a Y-axis direction. For example, the first conductive member 10 and the second conductive member 20 are substantially parallel to the X-Y plane.

For example, a void 10G is provided between the first conductive member 10 and the second conductive member 20. For example, at least a portion of a region between the first conductive member 10 and the second conductive member 20 other than the multiple first structure bodies 31 is the void 10G.

For example, a temperature difference is provided between the first conductive member 10 and the second conductive member 20. In one example, the temperature of the first conductive member 10 is greater than the temperature of the second conductive member 20. Thereby, electrons e1 are emitted from the first conductive member 10 toward the second conductive member 20. The electrons e1 can be extracted as electrical power. Thermionic power generation is performed in the power generation element 110. The current (the electrical power) that is obtained by the thermionic power generation is large when the temperature difference between the first conductive member 10 and the second conductive member 20 is large. When the temperature of the first conductive member 10 is greater than the temperature of the second conductive member 20, the first conductive member 10 is an emitter, and the second conductive member 20 is the collector. The distance along the Z-axis direction between the first conductive member 10 and the second conductive member 20 is taken as a gap length D1. As described below, the obtained current can be increased by reducing the gap length D1. For example, the efficiency of the power generation is increased.

In one example, the second portion 31*b* supports the second conductive member 20. The multiple first structure bodies 31 function as a spacer between the first conductive member 10 and the second conductive member 20. A stable gap length D1 is obtained by providing the multiple first structure bodies 31.

As shown in FIG. 1A, one direction that crosses the first direction (e.g., the Z-axis direction) is taken as a second direction. The second direction is, for example, any direction perpendicular to the Z-axis direction. The length along the second direction of the first portion 31*a* is taken as a first length w1. The length along the second direction of the second portion 31*b* is taken as a second length w2. The first length w1 and the second length w2 are, for example, the widths.

In the embodiment, it is favorable for the second length w2 to be less than the first length w1. For example, the second portion 31*b* is finer than the first portion 31*a*. Thermal conduction between the first conductive member 10 and the second conductive member 20 can be suppressed thereby. The reduction of the temperature difference between the first conductive member 10 and the second conductive member 20 due to thermal conduction can be suppressed thereby. A large current is obtained thereby. By setting the second length w2 to be less than the first length w1, a large current is obtained, and a high efficiency is obtained. According to the embodiment, a power generation element can be provided in which the efficiency can be increased.

In the embodiment, the first length w1 is not less than 1.2 times the second length w2. The thermal conduction can be suppressed compared to when the first length w1 is equal to the second length w2. The first length w1 may be not less than 2 times the second length w2. The thermal conduction can be effectively suppressed. The first length w1 may be not less than 5 times the second length w2. The thermal conduction can be more effectively suppressed.

In one example, the second portion 31*b* contacts the second conductive member 20. The height of the first structure body 31 substantially matches the gap length D1. For example, a length H1 along the first direction (the Z-axis direction) of one of the multiple first structure bodies 31 is, for example, not less than 100 nm and not more than 10 μm. For example, the gap length D1 is not less than 100 nm and not more than 10 μm.

For example, a stable length H1 is easily obtained by setting the length H1 (e.g., the gap length D1) to be not less than 100 nm. By setting the length H1 (e.g., the gap length D1) to be not less than 100 nm, for example, the reduction of the temperature difference between the first conductive member 10 and the second conductive member 20 due to radiation can be suppressed. By setting the length H1 (e.g., the gap length D1) to be not more than 10 μm, for example, the obtained current can be increased.

For example, in one of the multiple first structure bodies 31, the length (the width) along the second direction of a portion between the first portion 31*a* and the second portion 31*b* may be a length between the first length w1 and the second length w2. For example, one of the multiple first structure bodies 31 includes a portion at the midpoint between the first conductive member 10 and the second conductive member 20. In one example, the length (the width) along the second direction of the portion at the midpoint is not less than 0.2 times and not more than 0.8 times the average of the first and second lengths w1 and w2.

As shown in FIG. 1A, the container 50 includes a first member 50*a*, a second member 50*b*, and a side portion 50*c*. The element part 10E is surrounded with the first member 50*a*, the second member 50*b*, and the side portion 50*c*. In the example, an electrode 50*d* is provided at the second member 50*b*. The first conductive member 10 and the second conductive member 20 are located in a space surrounded with the first member 50*a*, the second member 50*b*, the electrode 50*d*, and the side portion 50*c*. The air pressure of the space is, for example, less than atmospheric pressure. The first member 50*a* is connected to the first conductive member 10. The electrode 50*d* is electrically connected to the second conductive member 20. For example, the current that is obtained by the power generation is extracted via the first member 50*a* and the electrode 50*d*.

In the example, the second member 50*b* functions as at least a portion of an elastic member 51. The second conductive member 20 is pressed onto the multiple first structure bodies 31 by the elastic member 51. The elastic member 51 is, for example, a spring, etc.

For example, the first portion 31*a* is chemically bonded with the first conductive member 10. For example, the second portion 31*b* abuts the second conductive member 20. The second portion 31*b* is substantially not chemically bonded with the second conductive member 20. The thermal conduction between the multiple first structure bodies 31 and the second conductive member 20 is easily suppressed thereby.

Figure 2A:
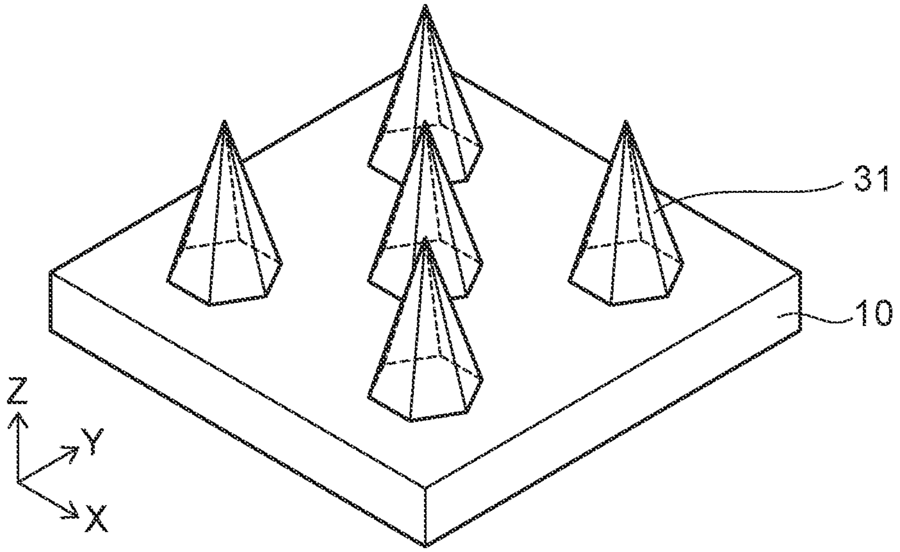
FIGS. 2A and 2B are schematic perspective views illustrating a method for manufacturing the power generation element according to the first embodiment.
Figure 2B:
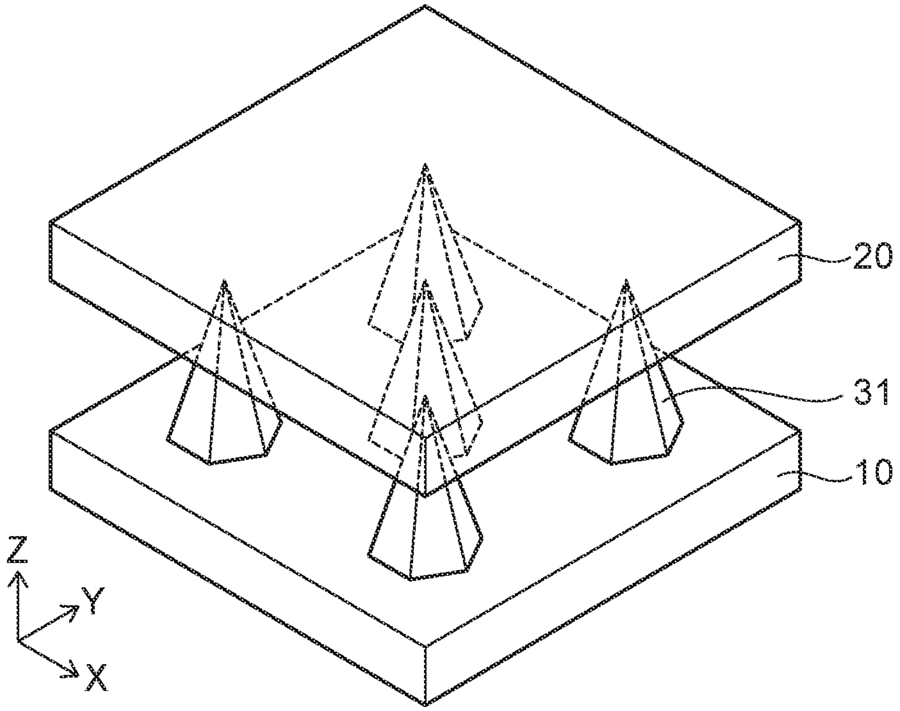

FIGS. 2A and 2B are schematic perspective views illustrating a method for manufacturing the power generation element according to the first embodiment.

As shown in FIG. 2A, the multiple first structure bodies 31 are formed on the first conductive member 10. For example, a layer that is used to form the multiple first structure bodies 31 is formed on the first conductive member 10 by sputtering, vapor deposition, etc. The multiple first structure bodies 31 such as those described above are obtained by patterning the layer. For example, a configuration of the multiple first structure bodies 31 such as that described above is obtained by controlling the etching conditions. Or, the multiple first structure bodies 31 such as those described above are obtained by forming a selective film. One of the multiple first structure bodies 31 is, for example, conic or frustum-shaped. The multiple first structure bodies 31 are chemically bonded with the first conductive member 10. For example, there are bonds between the atoms included in the multiple first structure bodies 31 and the atoms included in the first conductive member 10 at the interface between the first conductive member 10 and the multiple first structure bodies 31.

As shown in FIG. 2A, the second conductive member 20 is placed on the multiple first structure bodies 31. For example, a stable gap length D1 is obtained by the elastic member 51 or the like pressing the second conductive member 20 to the multiple first structure bodies 31. Thus, the power generation element 110 according to the embodiment is obtained.

FIGS. 3A to 3D are schematic cross-sectional views illustrating power generation elements according to the first embodiment.

The container 50 is not illustrated in these drawings. The multiple first structure bodies 31 are conic in the example of FIG. 3A. The multiple first structure bodies 31 are frustum-shaped in the example of FIG. 3B.

Figure 3A:
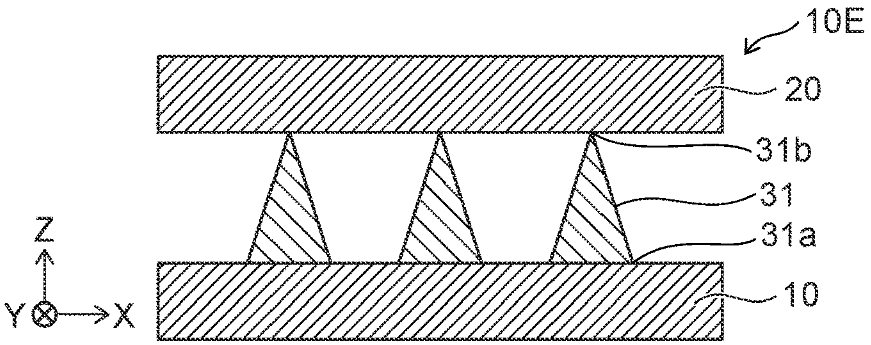
FIGS. 3A to 3D are schematic cross-sectional views illustrating power generation elements according to the first embodiment.
Figure 3B:
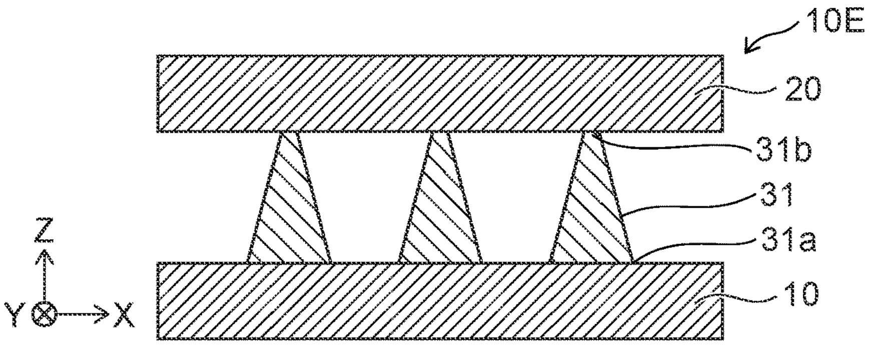
Figure 3C:
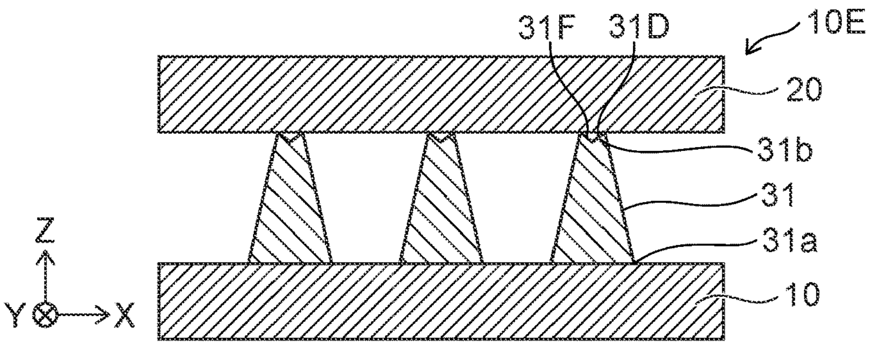

In the example of FIG. 3C, a recess 31D is provided in the second portion 31*b*. For example, the second portion 31*b* includes a top portion 31F. The top portion 31F faces the second conductive member 20. The top portion 31F includes the recess 31D. For example, at least a portion of the recess 31D is separated from the second conductive member 20. By providing the recess 31D, the thermal conduction can be further suppressed. The depth of the recess 31D is, for example, not less than 1 nm and not more than 100 nm.

Figure 3D:
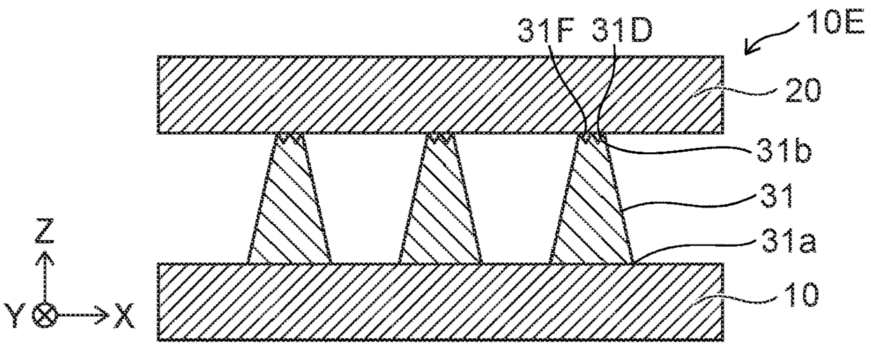

In the example of FIG. 3D, multiple recesses 31D are provided in the top portion 31F of the second portion 31*b*. Thus, a fine unevenness may be provided in the top portion 31F.

Figure 4:
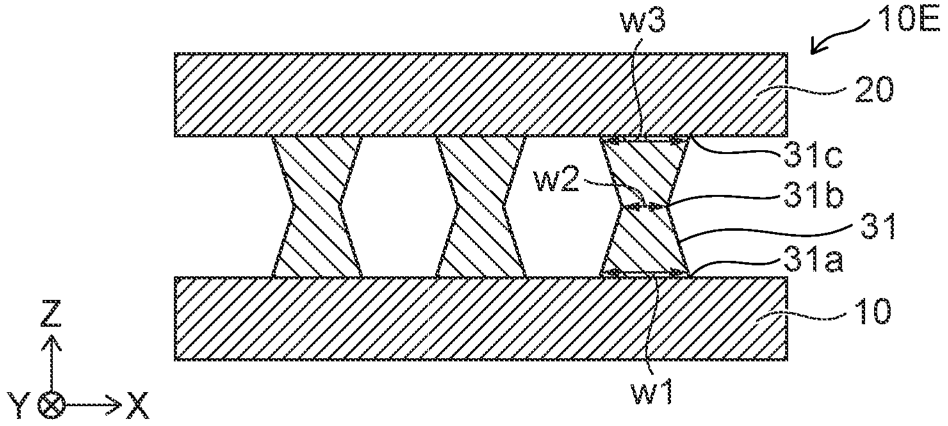
FIG. 4 is a schematic cross-sectional view illustrating a power generation element according to the first embodiment.
Figure 5A:
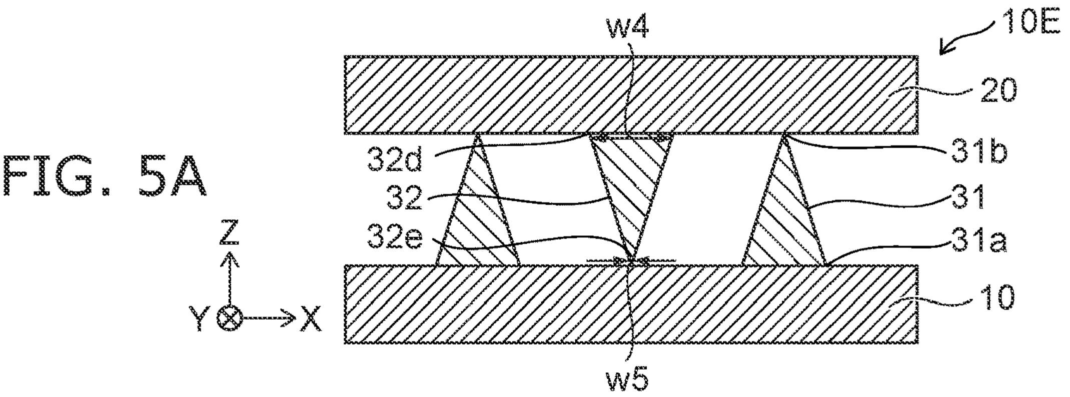
FIGS. 5A to 5D are schematic cross-sectional views illustrating power generation elements according to the first embodiment.
Figure 5B:
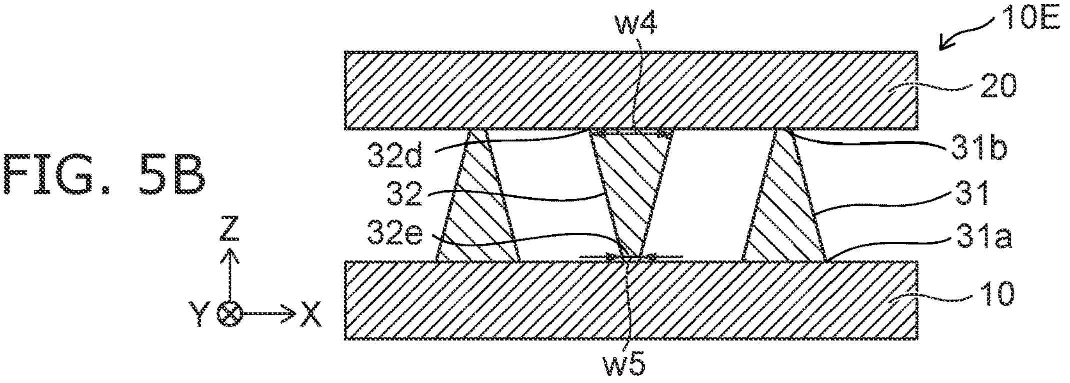
Figure 5C:
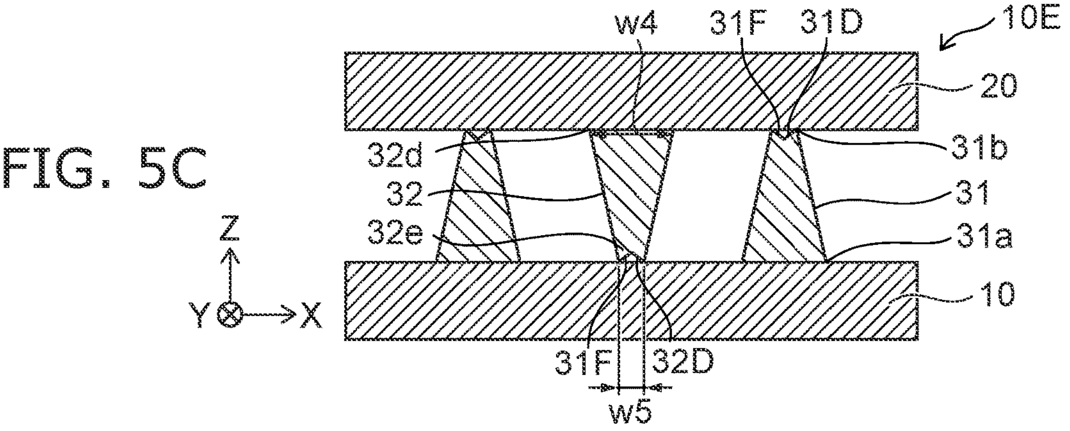
Figure 5D:
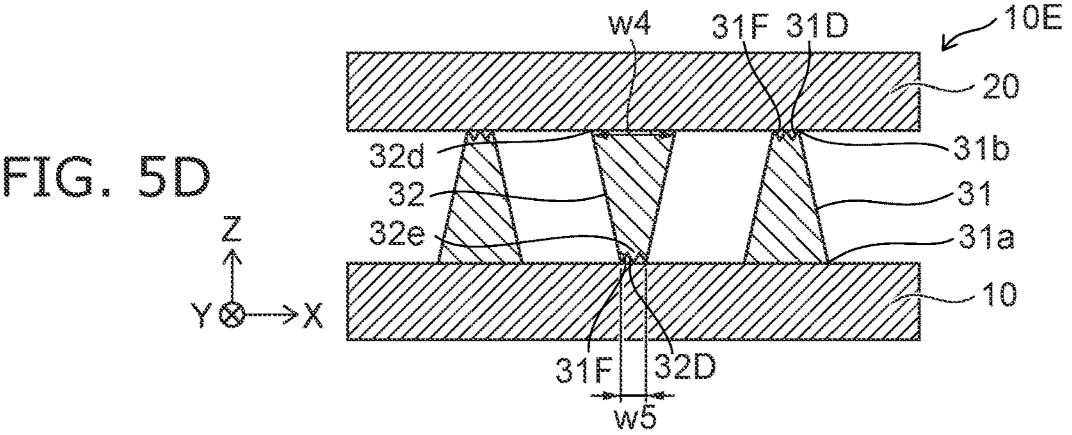

FIG. 4 is a schematic cross-sectional view illustrating a power generation element according to the first embodiment.

The container 50 is not illustrated in FIG. 4. As shown in FIG. 4, one of the multiple first structure bodies 31 may further include a third portion 31*c* in addition to the first and second portions 31*a* and 31*b*. The third portion 31*c* is between the second portion 31*b* and the second conductive member 20 in the first direction (the Z-axis direction). The length along the second direction of the third portion 31*c* is taken as a third length w3. The second length w2 is less than the third length w3. For example, the width of the middle portion of the first structure body 31 may be less than the widths of the end portions. In such a structure as well, the thermal conduction can be suppressed. The third length w3 is, for example, not less than 1.2 times the second length w2. The third length w3 may be not less than 2 times the second length w2. The third length w3 may be not less than 5 times the second length w2.

FIGS. 5A to 5D are schematic cross-sectional views illustrating power generation elements according to the first embodiment.

The container 50 is not illustrated in these drawings. As shown in FIGS. 5A to 5D, the element part 10E may include a second structure body 32 in addition to the first conductive member 10, the second conductive member 20, and the multiple first structure bodies 31. The second structure body 32 is located between the first conductive member 10 and the second conductive member 20. Multiple second structure bodies 32 may be provided.

The second structure body 32 includes a fourth portion 32*d* and a fifth portion 32*e*. The fourth portion 32*d* is fixed to the second conductive member 20. The fifth portion 32*e* is between the fourth portion 32*d* and the first conductive member 10. For example, the fourth portion 32*d* is chemically bonded with the second conductive member 20. For example, the fifth portion 32*e* abuts the first conductive member 10. For example, the second structure body 32 functions as a spacer.

The length along the second direction of the fourth portion 32*d* is taken as a fourth length w4. The length along the second direction of the fifth portion 32*e* is taken as a fifth length w5. The fifth length w5 is less than the fourth length w4. The thermal conduction can be suppressed thereby.

The fourth length w4 is, for example, not less than 1.2 times the fifth length w5. The fourth length w4 may be not less than 2 times the fifth length w5. The fourth length w4 may be not less than 5 times the fifth length w5.

For example, in the second structure body 32, the length (the width) along the second direction of the portion between the fourth portion 32*d* and the fifth portion 32*e* is the length between the fourth length w4 and the fifth length w5. For example, the second structure body 32 includes a portion at the midpoint between the first conductive member 10 and the second conductive member 20. In one example, the length (the width) along the second direction of the portion at the midpoint is not less than 0.2 times and not more than 0.8 times the average of the fourth and fifth lengths w4 and w5.

In the example described above, the first conductive member 10 is an emitter, and the second conductive member 20 is a collector. In the embodiment, the first conductive member may be a collector, and the second conductive member 20 may be an emitter. In such a case, the temperature of the second conductive member 20 is greater than the temperature of the first conductive member 10. Electrons are emitted from the second conductive member 20 toward the first conductive member 10 when a temperature of the second conductive member 20 is greater than a temperature of the first conductive member 10.

When the first conductive member 10 is the emitter and the second conductive member 20 is the collector, and when the second length w2 of the second portion 31*b* at the second conductive member 20 side is less than the first length w1 of the first portion 31*a* at the first conductive member 10 side, the electrons e1 that are emitted from the first conductive member 10 are not easily incident on the side surface (the oblique surface) of the first structure body 31. Thereby, for example, the electrons e1 efficiently reach the second conductive member 20. A higher efficiency is obtained thereby.

Second Embodiment

Figure 6A:
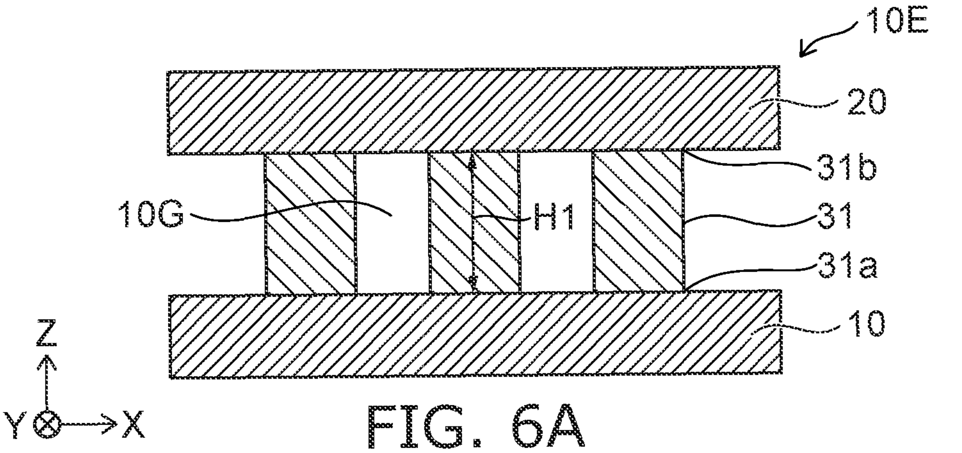
FIGS. 6A and 6B are schematic cross-sectional views illustrating a power generation element according to a second embodiment.
Figure 6B:
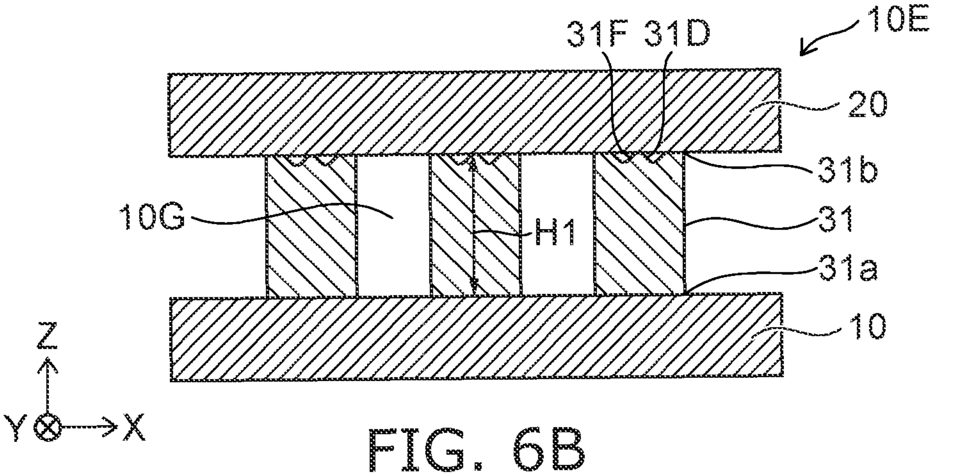

FIGS. 6A and 6B are schematic cross-sectional views illustrating a power generation element according to a second embodiment.

The container 50 is not illustrated in these drawings. As shown in FIGS. 6A and 6B, in the second embodiment as well, the element part 10E includes the first conductive member 10, the second conductive member 20, and the multiple first structure bodies 31. In the second embodiment, the widths of the multiple first structure bodies 31 may be substantially constant. In the second embodiment, the first portion 31*a* of the first structure body 31 is chemically bonded with the first conductive member 10, and the second portion 31*b* abuts the second conductive member 20. The thermal conduction can be suppressed thereby.

In the example shown in FIG. 6B, the top portion 31F of the second portion 31*b* of the first structure body 31 includes the recess 31D. At least a portion of the recess 31D is separated from the second conductive member 20. By providing the recess 31D, the thermal conduction can be further suppressed. The depth of the recess 31D is, for example, not less than 1 nm and not more than 100 nm.

In the second embodiment as well, the length H1 along the first direction (the Z-axis direction) of one of the multiple first structure bodies 31 is, for example, not less than 100 nm and not more than 10 μm. In the second embodiment as well, at least a portion of a region between the first conductive member 10 and the second conductive member 20 other than the multiple first structure bodies 31 is the void 10G. The power generation element 110 according to the second embodiment also may include the container 50 (referring to FIG. 1A). The element part 10E is located in the container 50. The air pressure in the container 50 is less than atmospheric pressure.

Figure 7:
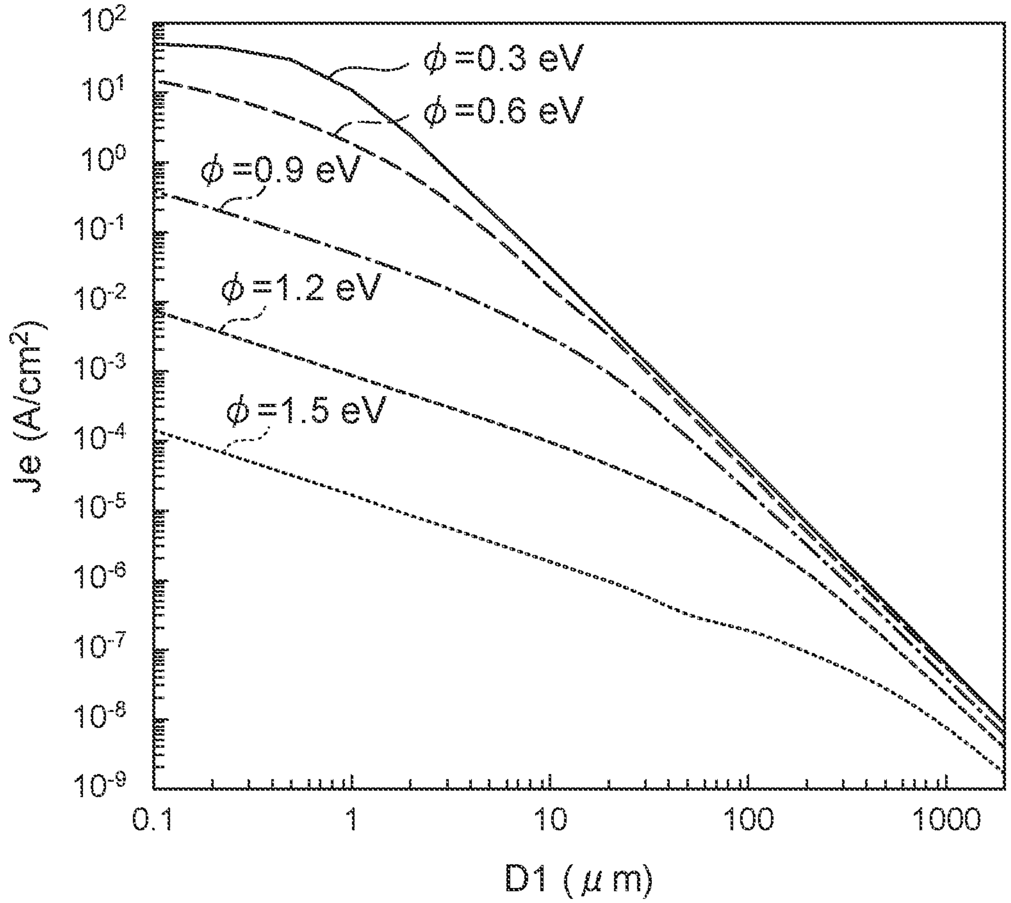
FIG. 7 is a graph illustrating characteristics of the power generation element.

FIG. 7 is a graph illustrating characteristics of the power generation element.

FIG. 7 illustrates simulation results of the relationship between the gap length D1 and the current obtained by the power generation. The horizontal axis of FIG. 7 is the gap length D1. The vertical axis is a current density Je. FIG. 7 illustrates the characteristics when a work function Φ of the emitter (e.g., the first conductive member 10) is changed.

As shown in FIG. 7, the current density Je increases as the gap length D1 decreases. In the embodiment, it is favorable for the gap length D1 (i.e., the length H1) to be not more than 10 μm. For example, a high current density Je is obtained thereby.

In the first and second embodiments, the multiple first structure bodies 31 include, for example, at least one selected from the group consisting of aluminum oxide and silicon oxide. A high insulation property is easily obtained thereby. In the embodiment, it is favorable for the multiple first structure bodies 31 to be insulative. The flow of a current between the first conductive member 10 and the second conductive member 20 via the multiple first structure bodies 31 is suppressed thereby. It is favorable for the second structure body 32 to be insulative. The multiple first structure bodies 31 and the second structure body 32 may include aluminum nitride. High heat resistance is easily obtained thereby. The multiple first structure bodies 31 and the second structure body 32 may include semiconductors.

In the first and second embodiments, at least one of the first conductive member 10 or the second conductive member 20 includes, for example, at least one selected from the group consisting of an Al-including nitride and diamond. The Al-including nitride is, for example, AlGaN. The composition ratio of AlGaN is, for example, not less than 0.2 and not more than 0.75.

Figure 8:
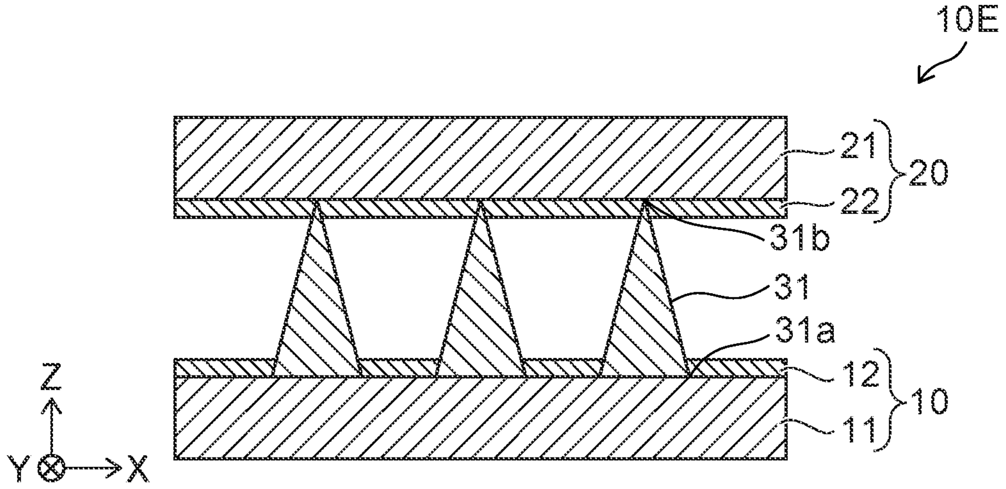
FIG. 8 is a schematic cross-sectional view illustrating a power generation element according to the embodiment.

FIG. 8 is a schematic cross-sectional view illustrating a power generation element according to the embodiment.

As shown in FIG. 8, the first conductive member 10 may include a first layer 11 and a surface layer 12. The surface layer 12 is located at the surface of the first layer 11. The first layer 11 includes, for example, an Al-including nitride (e.g., AlGaN). In such a case, the surface layer 12 includes at least one selected from the group consisting of Se, Cs, B, and Ca. The thickness of the surface layer 12 is, for example, not less than 0.1 nm and not more than 1 nm. By providing the surface layer 12, the electrons e1 are easily emitted. The surface layer 12 may have a continuous film shape, a mesh configuration, or a discontinuous island configuration. The surface layer 12 may be a region to which the elements described above are adsorbed.

The first layer 11 may include diamond. In such a case, the surface layer 12 includes hydrogen. The electrons e1 are easily emitted. It is favorable for the thickness of the surface layer 12 including hydrogen to be, for example, 1 atomic layer thick. The thickness of the surface layer 12 including hydrogen is, for example, not less than 0.1 nm and not more than 1 nm.

The second conductive member 20 may include a second layer 21 and a surface layer 22. The surface layer 22 is located at the surface of the second layer 21. The second layer 21 includes, for example, an Al-including nitride (e.g., AlGaN). In such a case, the surface layer 22 includes at least one selected from the group consisting of Se, Cs, B, and Ca. The thickness of the surface layer 22 is, for example, not less than 0.1 nm and not more than 1 nm. By providing the surface layer 22, the electrons e1 are easily accepted. The surface layer 22 may have a continuous film shape, a mesh configuration, or a discontinuous island configuration. The surface layer 22 may be a region to which the elements described above are adsorbed.

The second layer 21 may include diamond. In such a case, the surface layer 22 includes hydrogen. The electrons e1 are easily accepted. The thickness of the surface layer 12 including hydrogen is, for example, not less than 0.1 nm and not more than 1 nm.

At least one of the surface layer 12 or the surface layer 22 may be a continuous film or a discontinuous film.

Figure 9A:
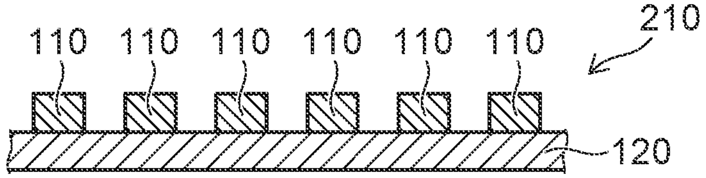
FIGS. 9A and 9B are schematic cross-sectional views showing a power generation module and a power generation device according to the embodiment.
Figure 9B:
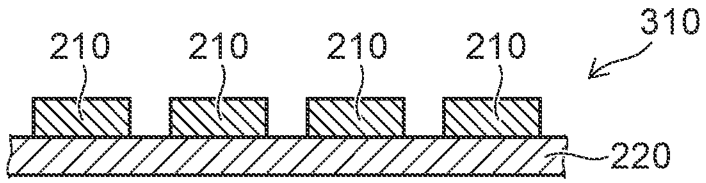

FIGS. 9A and 9B are schematic cross-sectional views showing a power generation module and a power generation device according to the embodiment.

As shown in FIG. 9A, the power generation module 210 according to the embodiment includes the power generation element 110 according to the embodiment. In the example, multiple power generation elements 110 are arranged on a substrate 120.

As shown in FIG. 9B, the power generation device 310 according to the embodiment includes the power generation module 210 described above. Multiple power generation modules 210 may be provided. In the example, the multiple power generation modules 210 are arranged on a substrate 220.

Figure 10A:
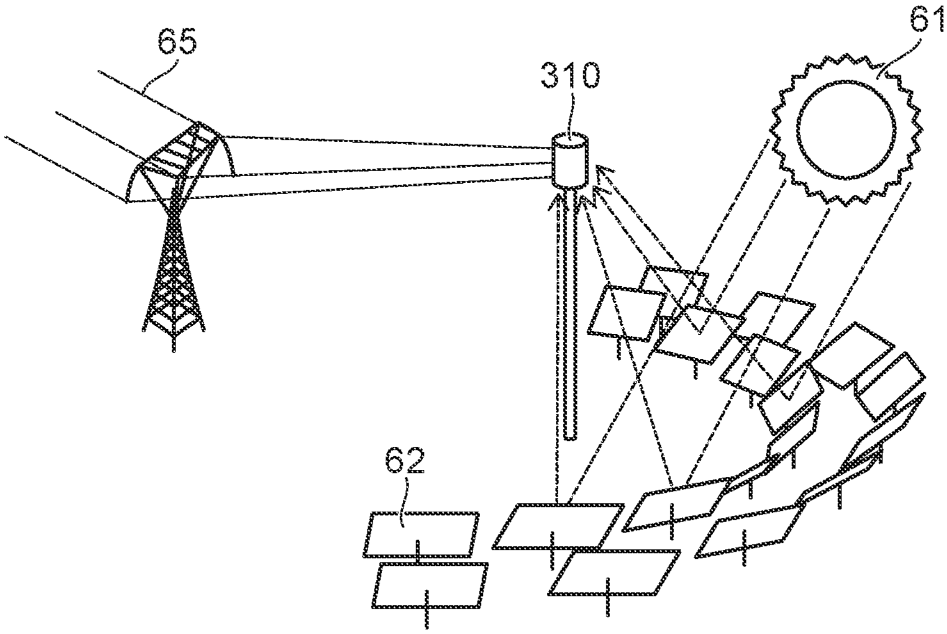
FIGS. 10A and 10B are schematic views showing the power generation device and the power generation system according to the embodiment.
Figure 10B:
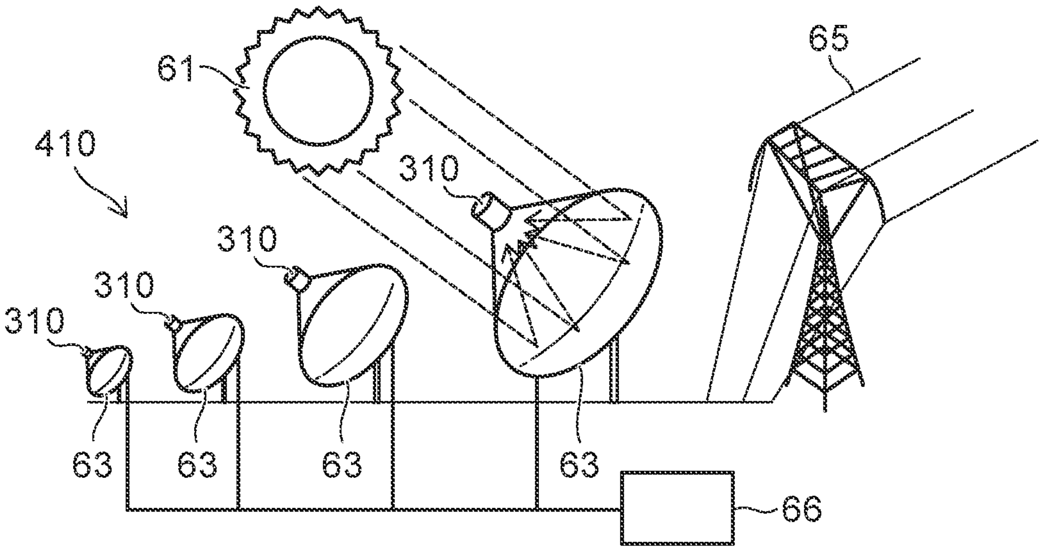

FIGS. 10A and 10B are schematic views showing the power generation device and the power generation system according to the embodiment.

As shown in FIGS. 10A and 10B, the power generation device 310 according to the embodiment (i.e., the power generation element 110 or the power generation module 210 according to the first embodiment) is applicable to solar thermal power generation.

As shown in FIG. 10A, for example, the light from the sun 61 is reflected by a heliostat 62 and is incident on the power generation device 310 (the power generation element 110 or the power generation module 210). For example, the light causes the temperature of the first conductive member 10 to increase. The temperature of the first conductive member 10 becomes greater than the temperature of the second conductive member 20. The heat is converted into a current. The current is transmitted by a power line 65, etc.

As shown in FIG. 10B, for example, the light from the sun 61 is concentrated by a concentrating mirror 63 and is incident on the power generation device 310 (the power generation element 110 or the power generation module 210). The heat due to the light is converted into a current. The current is transmitted by the power line 65, etc.

For example, the power generation system 410 includes the power generation device 310. In the example, multiple power generation devices 310 are provided. In the example, the power generation system 410 includes the power generation devices 310 and a drive device 66. The drive device 66 causes the power generation devices 310 to follow the movement of the sun 61. Efficient power generation can be performed by following the sun 61.

According to the embodiments, highly efficient power generation can be performed by using the power generation element 110.

According to the embodiments, a power generation element can be provided in which the efficiency can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in power generation elements such as conductive members, structure bodies, containers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all power generation elements practicable by an appropriate design modification by one skilled in the art based on the power generation elements described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A power generation element, comprising:
an element part including
a first conductive member,
a second conductive member, a first direction defines a direction from the first conductive member toward the second conductive member, and a second direction defines a direction perpendicular to the first direction, and
a plurality of first structure bodies provided between the first conductive member and the second conductive member,
one of the first structure bodies including a first portion and a second portion,
the first portion being fixed to the first conductive member,
the second portion being between the first portion and the second conductive member,
a length of the first portion along the second direction is greater than a length of the second portion along the second direction,
wherein the second portion includes a top portion facing the second conductive member,
wherein the top portion includes a recess, and
wherein at least a portion of the recess is separated from the second conductive member.

2. The element according to claim 1, wherein
the second portion supports the second conductive member.

3. The element according to claim 1, wherein
the one of the first structure bodies is conic or frustum-shaped.

4. The element according to claim 1, wherein
electrons are emitted from the first conductive member toward the second conductive member when a temperature of the first conductive member is greater than a temperature of the second conductive member.

5. The element according to claim 1, wherein
the length of the first portion along the second direction is not less than 1.2 times the length of the second portion along the second direction.

6. The element according to claim 1, further comprising:
a second structure body provided between the first conductive member and the second conductive member,
the second structure body includes a fourth portion and a fifth portion,
the fourth portion is fixed to the second conductive member,
the fifth portion is between the fourth portion and the first conductive member, and
a length of the fifth portion along the second direction is less than a length of the fourth portion along the second direction.

7. The element according to claim 6, wherein
the length of the fourth portion along the second direction is not less than 1.2 times the length of the fifth portion along the second direction.

8. The element according to claim 6, wherein
the fourth portion is chemically bonded with the second conductive member, and
the fifth portion abuts the first conductive member.

9. The element according to claim 1, wherein
the first portion is chemically bonded with the first conductive member, and
the second portion abuts the second conductive member.

10. The element according to claim 1, wherein
the one of the first structure bodies further includes a third portion,
the third portion is between the second portion and the second conductive member in the first direction, and
the second length is less than a third length along the second direction of the third portion.

11. The element according to claim 1, wherein
electrons are emitted from the second conductive member toward the first conductive member when a temperature of the second conductive member is greater than a temperature of the first conductive member.

12. The element according to claim 1, wherein
a length along the first direction of the one of the first structure bodies is not less than 100 nm and not more than 10 μm.

13. The element according to claim 1, wherein
at least a portion of a region between the first conductive member and the second conductive member other than the first structure bodies is a void.

14. The element according to claim 1, further comprising:
a container,
the element part being located in the container,
an air pressure in the container being less than atmospheric pressure.

15. The element according to claim 1, wherein
the first structure bodies include at least one selected from the group consisting of aluminum oxide, silicon oxide, and aluminum nitride.

16. The element according to claim 1, wherein at least one of the first conductive member or the second conductive member includes at least one selected from the group consisting of diamond and an Al-including nitride.

17. The element according to claim 1, wherein at least one of the first conductive member or the second conductive member includes:

a first layer including an Al-including nitride; and a surface layer provided at a surface of the first layer, and the surface layer includes at least one selected from the group consisting of Se, Cs, B, and Ca.

18. The element according to claim 1, wherein at least one of the first conductive member or the second conductive member includes:

a first layer including diamond; and a surface layer provided at a surface of the first layer, the surface layer including hydrogen.

19. A power generation element, comprising:

an element part including a first conductive member, a second conductive member, a first direction defines a direction from the first conductive member toward the second conductive member, and a second direction defines a direction perpendicular to the first direction, and a plurality of first structure bodies provided between the first conductive member and the second conductive member, one of the first structure bodies including a first portion and a second portion, the first portion being fixed to the first conductive member, the second portion being between the first portion and the second conductive member, a length of the first portion along a second direction is greater than a length of the second portion along the second direction, a second structure body provided between the first conductive member and the second conductive member, the second structure body includes a fourth portion and a fifth portion, the fourth portion is fixed to the second conductive member, the fifth portion is between the fourth portion and the first conductive member, and a length of the fifth portion along the second direction is less than a length of the fourth portion along the second direction.

20. A power generation element, comprising:

an element part including a first conductive member, a second conductive member, a first direction defines a direction from the first conductive member toward the second conductive member, and a second direction defines a direction perpendicular to the first direction, and a plurality of first structure bodies provided between the first conductive member and the second conductive member, one of the first structure bodies including a first portion and a second portion, the first portion being fixed to the first conductive member, the second portion being between the first portion and the second conductive member, a length along the second direction of the first portion is greater than a length along the second direction of the second portion, wherein electrons are emitted from the second conductive member toward the first conductive member when a temperature of the second conductive member is greater than a temperature of the first conductive member.

* * * * *